United States Patent
Lee et al.

(10) Patent No.: US 10,035,379 B2
(45) Date of Patent: Jul. 31, 2018

(54) HYBRID CORD AND HIGH-PERFORMANCE RADIAL TIRE INCLUDING THE SAME

(71) Applicant: HANKOOK TIRE CO., LTD., Seoul (KR)

(72) Inventors: Ji Wan Lee, Daejeon (KR); Il Yong Park, Daejeon (KR); Kum Kang Hwang, Daejeon (KR); Mi Jung Lee, Daejeon (KR); Sung Tae Kim, Daejeon (KR); Hyun Ran Cho, Daejeon (KR)

(73) Assignee: Hankook Tire Co., Ltd., Seoul (KR)

( * ) Notice: Subject to any disclaimer, the term of this patent is extended or adjusted under 35 U.S.C. 154(b) by 260 days.

(21) Appl. No.: 14/884,218

(22) Filed: Oct. 15, 2015

(65) Prior Publication Data

US 2016/0107485 A1 Apr. 21, 2016

(30) Foreign Application Priority Data

Oct. 21, 2014 (KR) ........................ 10-2014-0142849

(51) Int. Cl.
| | |
|---|---|
| *B60C 9/22* | (2006.01) |
| *D02G 3/48* | (2006.01) |
| *D02G 3/04* | (2006.01) |
| *B60C 9/00* | (2006.01) |
| *B60C 9/18* | (2006.01) |
| *B60C 9/20* | (2006.01) |

(52) U.S. Cl.
CPC ............ *B60C 9/005* (2013.01); *B60C 9/0042* (2013.01); *B60C 9/1821* (2013.01); *B60C 9/2003* (2013.01); *D02G 3/045* (2013.01); *D02G 3/047* (2013.01); *D02G 3/48* (2013.01); *B60C 2009/0035* (2013.01); *B60C 2009/0078* (2013.01); *B60C 2009/0092* (2013.01)

(58) Field of Classification Search
CPC .......... B60C 9/18; B60C 9/20; B60C 9/2003; B60C 9/22; B60C 9/2204; B60C 9/005; D02G 3/04; D02G 3/045; D02G 3/047; D02G 3/48
See application file for complete search history.

(56) References Cited

U.S. PATENT DOCUMENTS

| | | | |
|---|---|---|---|
| 6,533,012 B1* | 3/2003 | Jardine | B60C 9/22 152/526 |
| 2009/0090447 A1* | 4/2009 | Baldwin, Jr. | B60C 9/0042 152/451 |
| 2014/0223879 A1* | 8/2014 | Lee | D02G 3/48 57/241 |

FOREIGN PATENT DOCUMENTS

| | | | |
|---|---|---|---|
| DE | 102009003359 | * | 7/2010 |
| KR | 2004-0077875 | | 9/2004 |

* cited by examiner

*Primary Examiner* — Justin R Fischer
(74) *Attorney, Agent, or Firm* — Hamre, Schumann, Mueller & Larson, P.C.

(57) ABSTRACT

A hybrid cord for a tire, a method of manufacturing the same, and a high-performance environment-friendly radial tire including the same are disclosed herein. The hybrid cord includes a high-modulus fiber ply and a low-modulus fiber ply. The hybrid cord has a stress-strain curve including an initial modulus section, an intermediate modulus section and a final modulus section. The initial modulus of the initial modulus section is higher than the intermediate modulus of the intermediate modulus section, and the final modulus of the final modulus section is higher than the intermediate modulus.

8 Claims, 3 Drawing Sheets

HYBRID CORD AND HIGH-PERFORMANCE RADIAL TIRE INCLUDING THE SAME

BACKGROUND

1. Technical Field

The present embodiment relates generally to a hybrid cord and a high-performance radial tire including the same and, more particularly, to a hybrid cord having different physical properties on a stress-strain curve, excellent process-related manufacturing efficiency, and excellent quality uniformity compared to a conventional hybrid cord, and a high-performance radial tire including the same.

2. Description of the Related Art

With the improvement of the performance of vehicles and the betterment of road conditions, driving speed has gradually increased. In line with this tendency, research into tire cords used as the rubber reinforcing materials of tires have been actively carried out in order to enable the stability and durability of tires to be maintained during high-speed driving.

Since some materials used in tire cords have high strength but have low tensile elongation at their breaking points, they are not suitable for applications that require high tensile elongation at their breaking points. In contrast, since some materials have very high tensile elongation at their breaking points but do not have sufficient strength, they cannot be used for some applications that require high breaking pressures or the bearing of heavy loads.

To overcome these problems, a hybrid cord formed by combining and twisting together fiber having high fatigue resistance and a high tensile elongation at a breaking point and fiber having high strength was developed. The hybrid cord in the form of plied yarn is manufactured by twisting together two threads based on material having a small initial modulus (for example, polyamide 66) and material having a large initial modulus (for example, aramid) so as to assign tensile modulus that decreases in the case of small deformation and increases in the case of large deformation.

The hybrid cord having a plied yarn structure is disadvantageous in that speed decreases in the case of small deformation, and driving noise is caused by premature "stiffening," thereby degrading riding comfort based on a tire.

To overcome these problems, Korean Patent Application Publication No. 2004-0077875 discloses a technology in which the ratio of the final tangent modulus to initial tangent modulus of a hybrid cord is set to a value equal to or greater than 10, thereby reducing driving noise. In the above-referenced patent publication, polyamide 66 yarn is used as core yarn, and aramid yarn is used as covering yarn. In this case, to form polyamide into core yarn and aramid into covering yarn, it is necessary to assign a larger Z twist to the aramid than to the polyamide or to twist the polyamide in a direction opposite the direction in which the aramid is twisted. This method has a disadvantage in that it cannot be implemented by a state-of-the-art direct cabler, and suffers from significant losses in processing efficiency, such as an increase in the manufacturing period, because an old-fashioned ring twister must be used to perform the method. When a low tension is applied to dipping and heat treatment, a core-covering structure constructed during the plied yarn formation process can be maintained, and an aramid-polyamide 66 hybrid cord obtained as described above can be configured such that the ratio of a cutting modulus to an initial modulus is equal to or greater than 10. The reason why such a large modulus ratio is applied is to assign a low modulus to the initial section of a stress-strain curve in order to facilitate manufacturing and assign a high modulus to the final section of the stress-strain curve in order to improve the capability to resist deformation in a tensile direction in a finished tire.

Figure 1:
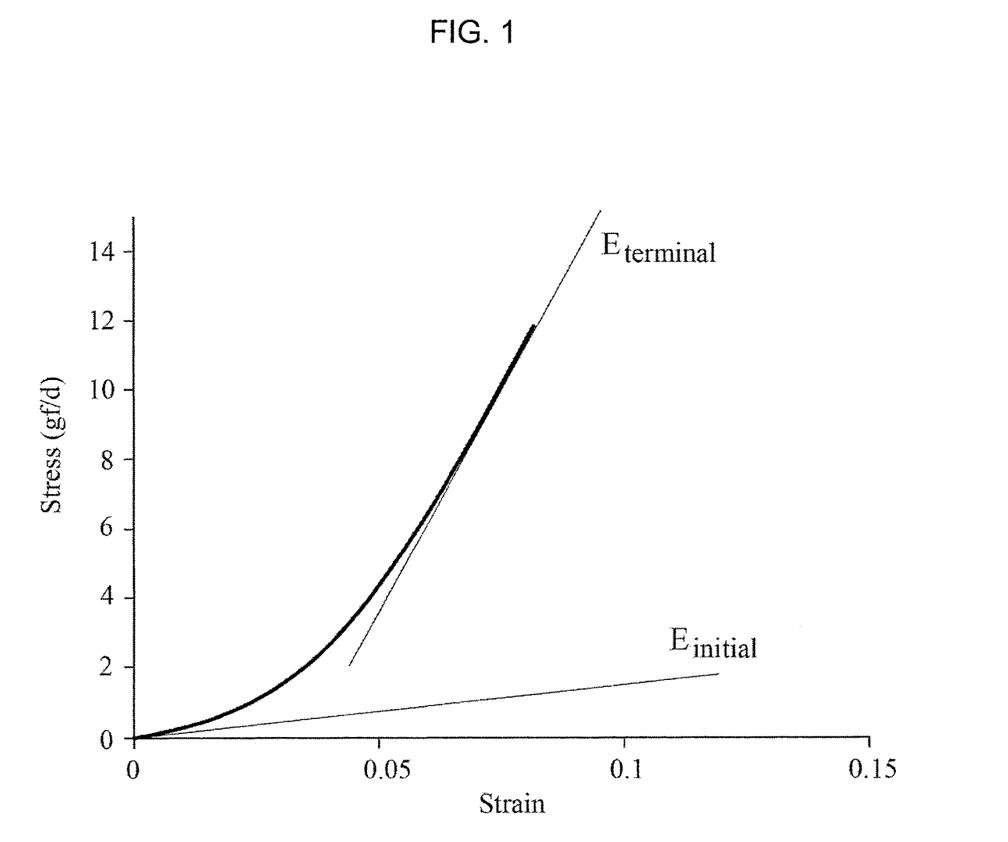
FIG. 1 shows the stress-strain curve of a conventional aramid hybrid cord.

FIG. 1 shows the stress-strain curve of an aramid-polyamide 66 hybrid cord manufactured using a conventional method. In FIG. 1, an initial modulus $E_{initial}$ is 14 gf/d, and a final modulus $E_{terminal}$ is 257 gf/d. Accordingly, the ratio between the final modulus and the initial modulus is 18.3, which is larger than 10, as described above. However, since the material of a fiber cord, such as a textile cord, is not in a solid state but corresponds to a thin fiber assembly, significant error may occur during measurement, and thus it is insufficient to simply define physical properties using the ratio between a final modulus and an initial modulus.

Furthermore, an excessively low initial modulus in the aramid-polyamide 66 hybrid cord may bring about the disadvantage of causing differences among products in subsequent processes including a rolling process. When tension is artificially reduced during a process of the heat treatment of a cord in order to achieve a low initial modulus, a problem arises in that differences among the physical properties of cords increase. When the initial modulus of the initial section of a stress-strain curve is excessively reduced in order to facilitate manufacturing, it is excessively lower than that of process conditions, and thus a problem may arise in that a cord may be easily deformed when tensile force is applied to the cord in the axial direction thereof during processing, with the result that the stability of dimensions may be degraded during a manufacturing process. Furthermore, a disadvantage arises in that differences among the physical properties of cords occurring during cord manufacturing processes may influence the uniformity and dimensions of finished tires.

In the conventional aramid-polyamide 66 hybrid cord, an initial modulus is set to a very low value in order to increase the ratio of a final modulus to the initial modulus. Accordingly, various problems occur in terms of the manufacture of a cord, resulting in an increase in manufacturing costs. For example, when a structure in which polyamide 66 yarn is disposed in a core and is then covered with aramid yarn is constructed, an aramid-polyamide 66 cord having a core-covering structure is generally manufactured using a method in which a twisting machine applies different twists to respective plies and tension is scarcely applied during a heat treatment process that is performed after dipping, thereby inducing the self-contraction of the polyamide 66 yarn. However, since all processes must be performed without tension, a disadvantage arises in that a very slow processing speed must be maintained, and differences among physical properties, such as the intermediate elongations of respective cords, etc., increase. Furthermore, the very low initial modulus makes it difficult to maintain uniform physical properties during the rolling and cutting/forming processes of a tire manufacturing process in which tensile force is applied, and ultimately influences the uniformity of the physical properties of tires.

SUMMARY

At least one exemplary embodiment of the present invention is directed to the provision of a hybrid cord that can overcome problems, i.e., the differences in the physical properties of a cord and a reduction in driving performance, occurring when the cord is used as the reinforcing material of a tire and thus can ensure the excellent uniformity and running performance of the tire.

At least one exemplary embodiment of the present invention is directed to the provision of a method of manufacturing a hybrid cord, which can manufacture a hybrid cord having uniform physical properties while overcoming processing difficulty occurring during the manufacture of a hybrid cord due to a low initial modulus in such a way as to vary changes in the characteristics that the transition points of the stress-strain curve of a hybrid cord have and also vary a modulus ratio for sections.

At least one exemplary embodiment of the present invention is directed to the provision of a high-performance environment-friendly radial tire in which the uniformity of the tire to which a hybrid cord according to an exemplary embodiment of the present invention has been applied is improved and the differences in the driving performance of the tire are reduced.

According to an aspect of the present embodiment, there is provided a hybrid cord, including a high-modulus fiber ply and a low-modulus fiber ply; wherein the hybrid cord has a stress-strain curve including an initial modulus section, an intermediate modulus section and a final modulus section, and wherein the initial modulus of the initial modulus section is higher than the intermediate modulus of the intermediate modulus section, and the final modulus of the final modulus section is higher than the intermediate modulus.

According to another aspect of the present embodiment, there is provided a method of manufacturing a hybrid cord, including: forming plied yarn by S-twisting two types of Z-twist yarn, i.e., low-modulus core yarn and high-modulus covering yarn, wherein the ratio of the input of the core yarn to the input of the covering yarn ranges from 1:1.05 to 1:1.2; and performing heat treatment, wherein an appropriate stretch ranging from 0.9 to 1.2 is given during the heat treatment.

According to still another aspect of the present embodiment, there is provided a high-performance radial tire, wherein a hybrid cord according to the present invention is used.

BRIEF DESCRIPTION OF THE DRAWINGS

The above and other objects, features and advantages of the present embodiment will be more clearly understood from the following detailed description taken in conjunction with the accompanying drawings, in which.

DETAILED DESCRIPTION

The present invention will be described in detail with reference to the accompanying drawings if necessary. Unless otherwise defined herein, all technical and scientific terms used herein have meanings commonly understood by those having ordinary skill in the technical field to which the present invention pertains.

The term "hybrid cord" used herein refers to a composite cord made of two or more types of materials having different characteristics. The term "core yarn" used herein refers to a thread of yarn that is disposed in the core of a hybrid cord. The term "covering yarn" used herein refers to one or more threads of yarn wound around the core yarn.

The term "high-modulus fiber" used herein refers to fiber having a tensile modulus ranging from 200 (180 g/dtex) to 600 g/d, and the term "low-modulus fiber" used herein refers to fiber having a relatively low modulus, whose tensile modulus ranges from 20 to 150 g/d.

In the present specification, the twist that yarn or a filament twisted in the counterclockwise direction has is referred to as "Z-twist," and the twist that yarn or a filament twisted in the clockwise direction has is referred to as "S-twist." A thread of yarn formed by Z-twisting a filament is referred to as "Z-twist yarn." The term "plied yarn" used herein refers to yarn formed by twisting two or more threads of yarn together in any one direction.

The term "initial modulus of a hybrid cord" used herein refers to the slope of a tangent at the origin after a primary load has been applied. The term "intermediate modulus of a hybrid cord" used herein refers to the modulus at a location where the slope of a tangent starts to increase after decreasing below that of an initial modulus section on the stress-strain curve of the hybrid cord. The term "final modulus of a hybrid cord" used herein refers to the modulus at which the slope of a tangent is identical to an elongation corresponding to the break of the cord on the stress-strain curve of the hybrid cord.

The term "transition point" used herein refers to the point where the slope of a tangent changes on the stress-strain curve of a hybrid cord.

In the present invention, a different modulus ratio is applied to the sections of a hybrid code composed of high-modulus-low-modulus fiber, such as aramid-polyamide 66, wholly aromatic polyester-polyamide 66 or the like, i.e., a conventional reinforcing cord for a high-performance radial tire, thereby improving the manufacturing efficiency of the hybrid cord and the process-related manufacturing efficiency of a tire. The differences in uniformity and driving performance can be reduced, compared to a tire to which an aramid-polyamide 66 hybrid cord having conventional characteristics has been applied.

A hybrid cord according to an exemplary embodiment of the present invention is a hybrid cord comprising:

a high-modulus fiber ply, and a low-modulus fiber ply;

wherein the hybrid cord has a stress-strain curve including an initial modulus section, an intermediate modulus section and a final modulus section, and wherein an initial modulus of the initial modulus section is higher than an intermediate modulus of the intermediate modulus section, and a final modulus of the final modulus section is higher than the intermediate modulus.

Figure 2:
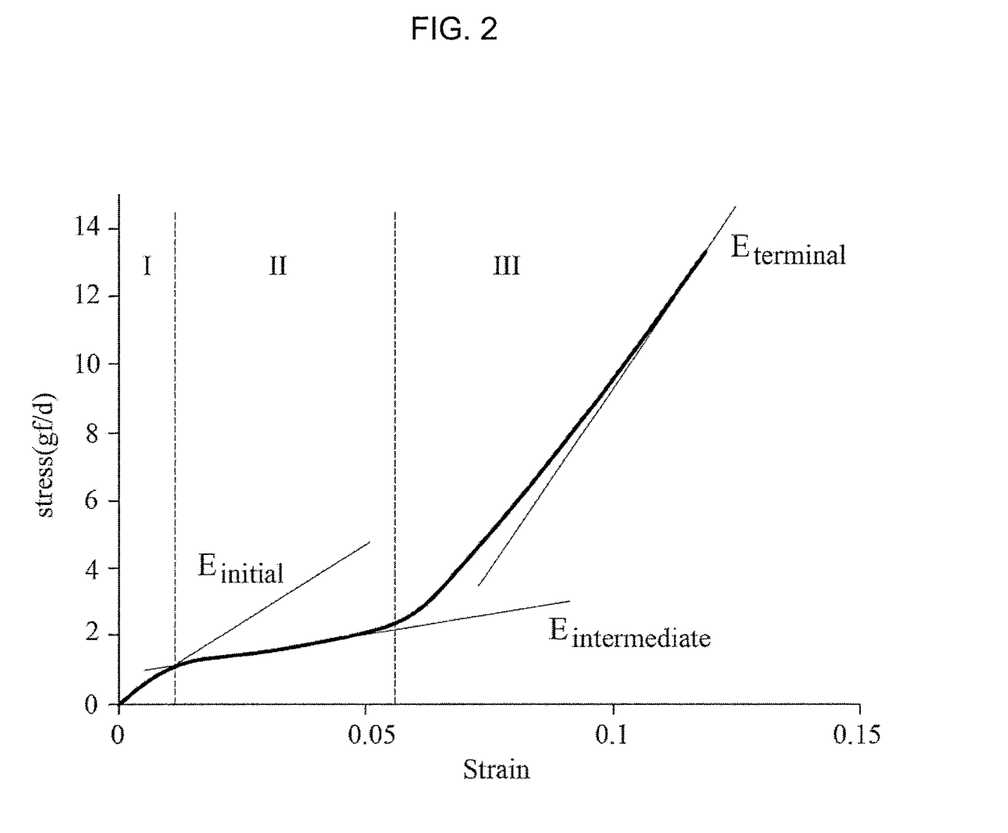
FIG. 2 shows the stress-strain curve of a hybrid cord according to an exemplary embodiment of the present invention.

FIG. 2 shows the stress-strain curve of a hybrid cord according to an exemplary embodiment of the present invention. The physical property sections of the hybrid cord of the present embodiment are divided into an initial modulus section I, an intermediate modulus section II, and a final modulus section III, as shown in FIG. 2. In the hybrid cord of the present embodiment, an initial modulus $E_{initial}$ has a value higher than that of an intermediate modulus $E_{intermediate}$ and a final modulus $E_{terminal}$ has a value higher than that of the intermediate modulus $E_{intermediate}$. That is, a conventional aramid hybrid cord has one transition point and two modulus sections, whereas the hybrid cord of the present embodiment has two modulus transition points and three modulus sections.

The stress-strain curve of the hybrid cord includes first and second modulus transition points, the first transition point is present within a strain range from 0.003 to 0.025, and the second transition point is present within a strain range from 0.03 to 0.065.

The initial modulus section of the hybrid cord of the present embodiment is a relatively high modulus section, which becomes a deformation section during rolling and cutting/forming processes. In the corresponding processes, the hybrid cord of the present embodiment exhibits desirable uniformity and a high modulus compared to the conventional cord, thereby reducing the differences in the physical properties of half-finished products. The second relatively low intermediate modulus section is a section that accommodates deformation attributable to belt lift during a curing process. Since a hybrid cord without this section obstructs the inflation of a tire during a curing process, a defect occurs, and thus this section is very important. The third section of the stress-strain curve is a section that includes the final modulus section. Since this section has the highest modulus and reveals the characteristics of aramid, this section ensures performance, such as the prevention of an increase in the diameter of a tire, stability during high-speed running, etc., in an actual tire.

In the hybrid cord of the present embodiment, the ratio of the initial modulus to the intermediate modulus may range from 1:0.4 to 1:0.85, and the ratio of the initial modulus to the final modulus may range from 1:4 to 1:9.

In the stress-strain curve of the aramid-polyamide 66 hybrid cord of FIG. 2, an initial modulus section has a modulus of 50 g/d, an intermediate modulus section has a modulus of 30 g/d, and a final modulus section has a modulus of 240 g/d. As described above, the stress-strain curve of the aramid-polyamide 66 hybrid cord has a characteristic in which the initial modulus is higher than the intermediate modulus and the final modulus is higher than the former ones. In this case, the ratio of the initial modulus to the intermediate modulus is 1:0.6, and the ratio of the initial modulus to the final modulus is 1:4.8. In this case, tensile tests are conducted under the conditions of a primary load of 0.1 g/d, a tensile speed of 300 mm/min, and a grip using an S clamp.

When an initial modulus is obtained, an initial modulus under a primary load condition is designed to be different from that of the conventional hybrid cord in order to exclude influence attributable to the structural deformation of plied yarn and a fiber assembly in initial minute deformation caused by fiber bundle strength that may vary due to non-uniformity in a plied yarn formation process. Although a primary load of 0.05 g/d is assigned to the conventional fiber cord, this is inaccurate for the obtainment of an initial modulus through differentiation in the section of a stress-strain curve having a strain of 0, and thus a method of slightly increasing a primary load value is selected. This is a method for preventing a significant difference in the value of the initial modulus from being generated even by a deviation occurring in the same process, regardless of the concept of a plied yarn formation process or a desired twisting method. This method may have the advantage of obtaining a consistent initial modulus value even when the number of specimens increases.

In an embodiment, a hybrid cord may include core yarn composed of polyamide 66 fiber and one or more threads of aromatic polyamide covering yarn helically wound around the core yarn in a plied yarn formation process. When a core-covering structure is eliminated by a heat treatment process, intrinsic physical properties can be revealed. This hybrid cord is a hybrid-type cord in which a ply composed of aliphatic polyamide fiber having excellent adhesive strength and excellent heat resistance and fatigue characteristics and a ply composed of aramid fiber have been combined into plied yarn. In this hybrid cord, the low modulus of the aliphatic polyamide fiber is supplemented with that of the aramid fiber, and disadvantageous machineability attributable to the low strain of the aramid fiber is supplemented with that of the aliphatic polyamide fiber, thereby reducing costs in the case of application to a product, such as a tire, and thus increasing the competitiveness of the product.

The polyamide yarn available for the core yarn may be one selected from the group consisting of common polyamide 6, polyamide 66 and polyamide 6.10, preferably polyamide 66. The covering yarn may be aramid yarn, polyketone, wholly aromatic polyester yarn, or the like.

The aramid is one of aromatic polyamide polymers, and exhibits a modulus 10 or more times that of polyamide because phenyl rings are linked to all main chains, except for amide groups. Such aramids are classified into para (p)-aramids and meta (m)-aramids depending on the state of the links of phenyl rings. Preferably, poly p-phenyleneterephtalamide (PPTA) that is linked in a para form is used. PPTA exhibits liquid crystal characteristics at a specific concentration of a solution dissolved in concentrated sulfuric acid, and is obtained by dry jet wet spinning.

Various types of high-strength fiber, in place of PPTA, may be used as the high-modulus yarn. Co-poly 3,4'-diphenylether/p-phenyleneterephtalamide (DPE/PPTA), i.e., one of aromatic polyamides, may be used. DPE/PPTA exhibits isotropy, other than liquid crystal characteristics, during the dissolution thereof in a solvent, and is characterized in that it is elongated 10 times during a heat treatment process that is performed after dry jet wet spinning, so that a microstructure is developed therein. As another high-strength fiber, wholly aromatic polyesters may be used. These are high-strength fibers that have thermotropic liquid crystal characteristics and that are obtained by melt spinning, unlike the above-described aramids.

The hybrid cord may include 20-80% of 500-1600 denier aramid yarn and 80-20% of 400-1300 denier polyamide 66 yarn. In the hybrid cord of the present embodiment, when the fraction of the aramid yarn is less than 20%, the effect of an increase in modulus under a heavy load condition is slight, and thus an improvement in running performance, i.e., an intended purpose, cannot be expected upon application to a tire. In contrast, when the fraction of the aramid yarn exceeds 80%, the initial modulus becomes very high, noise and a reduction in riding comfort occur, and thus it is difficult to apply it to a high-quality tire.

The aramid yarn is preferably high-strength aramid yarn having a tensile strength equal to or higher than 16 g/D and a Young's modulus ranging from 200 to 600 g/d.

Another aspect of the present invention is directed to a method of manufacturing hybrid cord yarn. In the method of the present embodiment, when a hybrid cord is manufactured through the step of manufacturing plied yarn by S-twisting two types of Z-twist yarn, i.e., low-modulus core yarn and high-modulus covering yarn, plied yarn is formed in the state in which the ratio of the input of the core yarn to the input of the covering yarn ranges from 1:1.05 to 1:1.2, i.e., in the state in which the inputs of the covering yarn and the core yarn are different, and then a stretch ranging from 0.9 to 1.2 is given during heat treatment.

Aliphatic polyamide yarn, such as polyamide 6, polyamide 66 or polyamide 6 or 10, may be used as the low-modulus core yarn, and yarn selected from the group consisting of aramid yarn, polyketone and wholly aromatic polyester may be used as the high-modulus covering yarn.

In the above plied yarn forming process, the S-twisting is preferably performed such that an S twist ranges from 200 to 500 twists per meter (TPM), and the two types of Z-twist yarn preferably have the same twist.

In the manufacture of the conventional aramid hybrid cord, plied yarn is formed using a 2-for-1 twisting machine or the like during a plied yarn formation process so that aramid yarn and polyamide 66 yarn have different TPMs, the polyamide 66 is disposed close to a core part and the aramid cord is disposed close to a covering part, and a significant tension is not given during a heat treatment process. However, this type of aramid hybrid cord exhibits a very low initial modulus.

The present embodiment employs a method, such as that described below, in order to achieve a difference between the initial modulus and intermediate modulus of a stress-strain curve. To form a structure in which polyamide 66 yarn is used as the core yarn and aramid yarn is used as the covering yarn during the plied yarn formation process, a core-covering structure is formed using different inputs during a twisting process, instead of using different Z twists for the polyamide 66 yarn and the aramid yarn. In the plied yarn formation process of the present embodiment, the ratio of the input of the core yarn to the input of the covering yarn ranges from 1:1.05 to 1:1.2. Weaving is performed using the core yarn-covering yarn plied cord obtained described above, and a stretch ranging from 0.9 to 1.2 is given during heat treatment. Once the heat treatment has been performed, the core-covering structure is eliminated.

During the dipping and heat treatment of the manufacturing process, a change in tension selected from temperature, time and tension is given to a greige fabric of the aramid-polyamide hybrid cord having a core-covering structure. In the case of the conventional aramid-polyamide 66 hybrid cord, a method of giving a tension at a level that enables a process to be performed, thereby achieving the difference between the initial modulus and final modulus of a finished hybrid cord significant while maintaining a core-covering structure, is used. In contrast, in the present embodiment, heat treatment is performed such that the core-covering structure can be eliminated by giving a sufficient tension during the heat treatment of the above-described aramid-polyamide 66 cord having a core-covering structure. The reason why heat treatment is performed as described above is to increase the modulus by generating thermal elongation during the heat treatment of the polyamide 66 yarn, resulting in an increase in the initial modulus of the finished aramid-polyamide 66 hybrid cord. In the aramid-polyamide 66 hybrid cord manufactured as described above, the initial modulus thereof is higher than that of the conventional core-covering type aramid hybrid cord, and an intermediate modulus section is present in a stress-strain curve during deformation attributable to external force. The reason why the intermediate modulus having a slope more gradual than that of the initial modulus can be present is that the initial modulus is increased by the polyamide 66 yarn subjected to sufficient tension in heat treatment during an initial tension process and then a load is not only applied to the aramid yarn but a sufficient load is also applied to the polyamide 66 yarn in the section where the molecular chains of the polyamide 66 yarn are unlinked. In a subsequent tensile deformation section, the aramid yarn is subjected to force and, thus, exhibits a high final modulus.

The manufacturing method is described in detail below using a hybrid cord including polyamide core yarn and aramid covering yarn as an example.

When a hybrid cord is manufactured using the method of the present embodiment, the process of Z-twisting each of a polyamide filament and an aramid filament and the process of S-twisting together the polyamide Z-twist yarn and the aramid Z-twist yarn formed by the Z-twisting process are simultaneously performed, and plied yarn formed by the Z-twisting and S-twisting processes is dipped into an adhesive solution, dried and then subjected to heat treatment.

A greige cord having a structure in which polyamide 66 is used as core yarn and aramid yarn is used as covering yarn is manufactured by giving an appropriate Z-direction twist to an aramid fiber bundle having an almost linear tensile characteristic and a very high initial modulus, giving the same twist to polyamide 66 having a low initial modulus, and inputting a larger amount of aramid yarn. The greige cord manufactured as described above is woven at an appropriate ends per inch (EPI). Spun yarn composed of cotton or rayon is used as the weft, used in the above case, to be advantageous for cutting that is performed later. The greige fabric manufactured as described above is passed through an adhesive dipping solution including mixed solution, commonly called "resorcinol-formaldehyde latex (RFL)," and is then subjected to heat treatment. In contrast, when the greige fabric is not manufactured, a dipped Single End Cord (SEC) is manufactured by performing heat treatment using SEC heat treatment equipment without performing a weaving process. When an appropriate stretch ranging from 0.9 to 1.2 is given during the heat treatment of the greige fabric and the SEC, an aramid hybrid cord having an initial modulus, an intermediate modulus and a final modulus of different values and S twists is manufactured, and a tire is manufactured using such aramid hybrid cords.

In greater detail, the cord of the present embodiment may be manufactured using 20-80% of 500~1600 denier unit ply aramid cords and 80-20% of 400-1300 denier polyamide 66 cords so that each of ply and cord twists ranges from about 200 to 500 twists per meter (TPM). This varies depending on a twist factor based on the fineness based on corrected weight of the hybrid cord. By doing so, a hybrid cord having a fineness based on corrected weight versus strength equal to or higher than 11 g/D, an initial modulus ranging from 20 to 50 g/D, and a high-load modulus ranging from 30 to 300 g/D can be manufactured.

The twist factor $\alpha_d$ of the hybrid cord of the present embodiment, which can be expressed by the following Equation 1, may fall within the range from 100 to 250. Based on the twist factor of the following Equation 1, the strength and the machineability can be reduced due to a lack of cord fiber bundle strength when the twist factor is lower than 100, and the cord strength and the modulus can reduced and thus application to desired performance tires is impossible when the twist factor exceeds 250.

$$\alpha_d = \frac{T}{100}\sqrt{\rho_d} \quad (1)$$

where $\alpha_d$ is the denier-based twist factor, T is twists per meter (TPM), and $\rho_d$ is the fineness based on corrected weight of the hybrid cord on a denier basis.

When the fineness based on corrected weight of the aramid hybrid cord is additionally reduced, concern about insufficient strength can be mitigated by increasing the EPI of the aramid hybrid cord fabric. For example, although 24 EPI is theoretically impossible in the case of the conventional aramid 1500D/2+polyamide 66 1260D/1 hybrid cord, 40 or higher EPI may be applied to the case of the aramid 600D/1+polyamide 66 400D/1.

To strengthen adhesiveness to a tire, the plied yarn obtained as described above is dipped into and passed through an adhesive solution, dried at about 100-170° C., and then subjected to heat treatment and thermal setting at a temperature ranging 200 to 260° C., thereby completing the hybrid cord of the present embodiment. In this case, an appropriate stretch ranging from 0.9 to 1.2 is given during the drying and heat treatment processes, as described above. Using these dipping, drying and heat treatment processes, the surface of the plied yarn is coated with the adhesive component of the adhesive solution with which the plied yarn has been impregnated in the previous process, and thus adhesiveness to a rubber composition used in the manufacture of a tire in a subsequent process is increased.

The hybrid cord of the present embodiment may be ideally applied to the reinforcement of rubber and other elastic products. Although products including the hybrid cord of the present embodiment are not limited to particular products, the hybrid cord of the present embodiment may be used in rubber products, such as pneumatic tires, hoses, belts and bellows, and other elastic matrix products by way of example.

Still another aspect of the present embodiment is directed to a high-performance radial tire including the hybrid cord of the present embodiment. In particular, the hybrid cords of the present embodiment may be advantageously applied to a tread intended for the bearing of a load and the prevention of deformation attributable to high-speed driving and a cap ply intended for the prevention of the deformation of a belt part.

Figure 3:
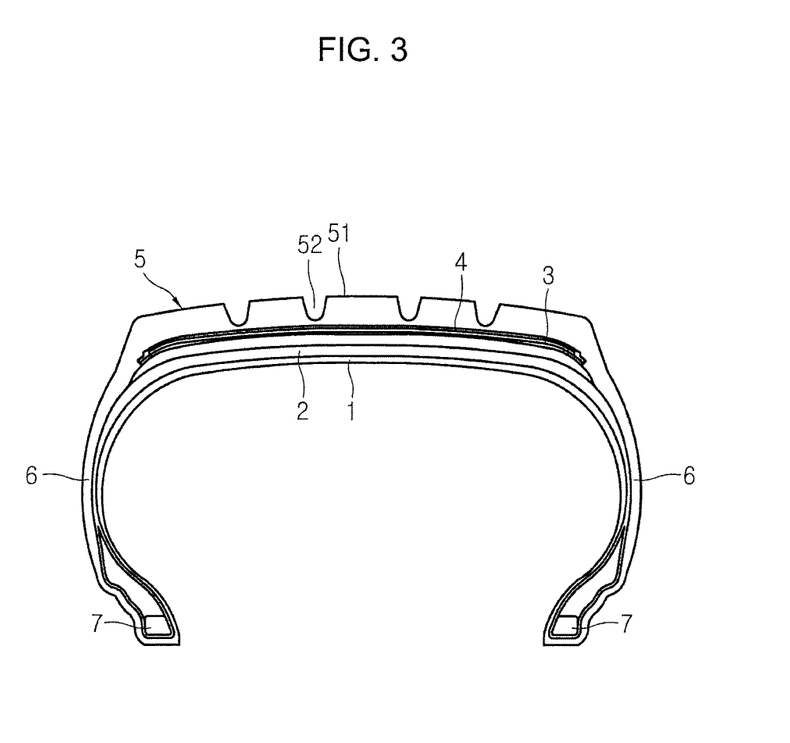
FIG. 3 is a schematic sectional view of a radial tire to which a hybrid cord according to an exemplary embodiment of the present invention can be applied.

FIG. 3 schematically shows the structure of a tire manufactured by applying hybrid cords according to an exemplary embodiment of the present invention to a cap ply. As shown in FIG. 3, a tire according to an exemplary embodiment of the present invention includes: an inner liner 1 configured to form the inner circumference of the tire; a carcass 2 disposed on the outer circumferential surface of the inner liner 1; at least one layer of belt 3 disposed on the outer circumferential surface of the carcass 2; a cap ply 4 configured to be disposed on the outer circumferential surface of the belt 3 and fasten the belt 3; a tread layer 5 configured to be disposed on the outer circumferential surface of the cap ply 4 and substantially come into contact with the ground; both sidewalls 6 configured to form both side surfaces of the tire; and both beads 7 configured to be fitted around a wheel and maintain the internal air pressure of the tire. Furthermore, the cap ply 4 is disposed over the overall circumference of the belt 3 or both sides of the outer circumference of the belt 3 as shown in FIG. 3. The cap ply 4 functions to prevent a separation phenomenon in which the belt is separated due to the deterioration thereof or a tread block 51 is ripped off due to the repetition of deformation and recovery in a circumferential direction during the running of a vehicle. Furthermore, when deformation in which the diameter of a tire increases occurs due to centrifugal force attributable to high-speed driving, changes in high-speed handling resulting from changes in the ground surface are suppressed, which improves driving stability during high-speed driving.

As described above, when hybrid cords formed by combining two cords together is employed as a reinforcing ply and are disposed between the cap ply and the tread, a heat generation phenomenon attributable to the separation of a cord from the belt and the deformation of the belt can be prevented using the excellent contractibility of the polyamide cords, and a heat generation phenomenon can be prevented using the characteristics of the aramid cords in which the degradation of physical properties at high temperature is low and deformation attributable to shear stress is little thanks to a high modulus. Furthermore, the high adhesion performance of the polyamide cords may compensate for the disadvantage of the relatively low adhesion performance of the aramid cords. In particular, in the tire in which the hybrid cords of the present embodiment have been applied to the cap ply, process-related manufacturing efficiency and the uniformity of a finished tire are improved and the differences in driving performance are reduced.

The present invention is described in detail based on embodiments as follows, and is not limited to these embodiments.

Examples 1-2 and Comparative Example 1-3

In comparative example 1, polyamide 66 was used for a reinforcing belt; in comparative example 2, aramid was used; and in comparative example 3, aramid-polyamide 66 hybrid cords, which were manufactured using the conventional method and in which the ratio between a final modulus and an initial modulus was equal to or higher than 10, were used. In examples 1 and 2, aramid-polyamide 66 hybrid cords, which were manufactured using the above-described method and which had new physical characteristics and a low fineness based on corrected weight, were used. In Example 1, a reduction in weight was attempted by reducing a fineness based on corrected weight. In example 2, yarn that is the same as that of comparative example 3 was used. In both examples 1 and 2, aramid hybrid cords, which were subjected to the above-described plied yarn formation and heat treatment processes and two modulus transition points were present, were used.

Indoor driving tests and actual vehicle performance tests were conducted using tires (225/45R17) including the hybrid cords used in the above embodiments and comparative examples; uniformity, dynamic profiles, rolling resistance, high-speed driving durability, vehicle handling stability, riding comfort and noise characteristics were measured using the following methods; and the results of the tests are listed in Table 1.

[Performance Evaluation Methods]

The uniformity is a composite index value of the values of R1H, conicity, etc. that were measured using a uniformity measuring device. A higher value based on the value of comparative example 1 is advantageous.

The rolling resistance was evaluated using an SAE J1269 method, and was represented in the form of an index based on the RRc value of comparative example 1 set to 100. A higher index value is advantageous to the rolling resistance.

The high-speed driving durability was evaluated in the state in which after a tire had been loaded into a drum-type driving durability tester and a drum has been rotated, the tire and the drum were coupled together and rotated, and speed was increased in steps in imitation of the running conditions of an actual tire. The evaluation was performed while the speed was being increased in increments ranging from 20 to 30 km/h every 10 minutes.

The dynamic profile was measured in such a manner that increases in circumference attributable to centrifugal force based on running speeds were measured using dedicated test equipment and also changes in profile at each location in the range from a shoulder to a tread part were measured and recorded. It is determined that a small change in profile exhibits excellent performance. In Table 1, the value of comparative example 1 is represented by an index of 100. A value higher than 100 indicates that it is superior to that of comparative example 1.

The vehicle handling stability, the riding comfort, and the noise performance are indices of the values that a test driver felt when actually driving a vehicle equipped with a test tire. The value of comparative example 1 is set to an index of 100, and a value higher than 100 indicates excellence. When a value in question is equal to or higher than the reference index of 100, the value in question is superior to that of comparative example 1. In contrast, when a value in question is lower than 100, the value in question is inferior to that of comparative example 1.

TABLE 1

|  | Comparative Example 1 | Comparative Example 2 | Comparative Example 3 | Example 1 | Example 2 |
| --- | --- | --- | --- | --- | --- |
| Structure | polyamide 66 840D/2 28EPI | aramid 1500D/2 21EPI | aramid 1500D/2+ polyamide 66 1260D/120EPI | aramid 700D/2+ polyamide 66 840 38EPI | aramid 1500D/2+ polyamide 66 1260D/120EPI |
| S twist (TPM) | S 470 | S 330 | S 285 | S 370 | S 280 |
| Z twist (TPM) | Z 480 | Z 330 | aramid Z 290 polyamide Z 190 | aramid Z 385 polyamide Z 85 | aramid Z 285 polyamide Z 285 |
| Number of modulus transition points | — | — | 1 | 2 | 2 |
| Ratio among initial modulus, intermediate modulus and final modulus | 1/—/3.6 | 1/—/1-5 | 1/—/13.4 | 1/0.8/5.1 | 1/0.8/5.5 |
| Specifications | 225/45R17 | 225/45R17 | 225/45R17 | 225/45R17 | 225/45R17 |
| Part for application | cap ply | cap ply | cap ply | cap ply | cap ply |
| Weight (kg) | 11.4 | 11.6 | 11.8 | 11.2 | 11.9 |
| Uniformity | 100 | 90 | 96 | 110 | 109 |
| Dynamic profile | 100 | 130 | 125 | 121 | 128 |
| Rolling resistance | 100 | 98 | 96 | 108 | 99 |
| High-speed driving durability | 1:45 | 1:55 | 1:59 | 1:58 | 2:03 |
| Vehicle handling stability | 100 | 110 | 112 | 117 | 119 |
| Riding comfort | 100 | 80 | 96 | 101 | 102 |
| Noise | 100 | 85 | 102 | 103 | 101 |

From the results of Table 1, it can be seen that in comparative example 1 using polyamide 66 cords, noise and riding comfort are superior but high-speed driving durability and vehicle handling stability are inferior, and can be also seen that in comparative example 2 using aramid cords, high-speed driving durability and vehicle handling stability are superior but noise and riding comfort are inferior. In contrast, it can be seen that in comparative example 3 using aramid-polyamide 66 hybrid cords having a general-purpose fineness, desirable results were obtained overall for noise, riding comfort, high-speed driving durability, and vehicle handling stability. However, a low value was obtained for rolling resistance due to an increase in the weight of a tire, and a low value was also obtained for uniformity due to the non-uniformity of the physical properties of the hybrid cords.

In contrast, in the cases of Examples 1 and 2 using the aramid-polyamide 66 hybrid cords according to the present invention, values similar to or superior to those of comparative example 3 were exhibited for high-speed driving durability, vehicle handling stability, dynamic profile, and riding comfort. In particular, in Example 1, the best rolling resistance characteristic was exhibited, and a value superior to those of comparative examples 1, 2 and 3 was exhibited for uniformity. As a result, it can be seen that the hybrid cords of the present invention reduced the differences in the characteristics of the tire due to an overall reduction in the differences in physical properties.

According to at least one exemplary embodiment of the present invention, there is provided a hybrid cord that not only has excellent process-related manufacturing efficiency but can also improve both running capability and riding comfort when it is applied to a tire.

According to at least one exemplary embodiment of the present invention, there is provided a hybrid cord that can mitigate difficulty setting a tension condition in the manufacture of a hybrid cord and a tire, thereby improving process-related manufacturing efficiency in the manufacture of a hybrid cord and a tire.

According to at least one exemplary embodiment of the present invention, there is provided a tire to which hybrid cords according to an exemplary embodiment of the present invention have been applied, in which the uniformity of tire performance is excellent, manufacturing deviations are reduced, and thus it is easy to predict the performance of the tire.

According to at least one exemplary embodiment of the present invention, there is provided an environment-friendly high-performance radial tire in which the weight of the tire is reduced by applying fiber cords having a low fineness based on corrected weight to the tire, thereby additionally improving fuel mileage performance.

While the present invention has been described based on the specific embodiments in detail, this is merely for the purpose of describing the present invention. It is apparent to those skilled in the art that various modifications and alternations are possible within the scope of the technical spirit of the present invention. Therefore, these modifications and alterations should be interpreted as falling within the attached claims.

What is claimed is:

1. A hybrid cord, comprising:
a high-modulus fiber ply, and a low-modulus fiber ply;
wherein the hybrid cord has a stress-strain curve including an initial modulus section, an intermediate modulus section and a final modulus section, and wherein an initial modulus of the initial modulus section is higher than an intermediate modulus of the intermediate modulus section, and a final modulus of the final modulus section is higher than the intermediate modulus;
a ratio of the initial modulus to the intermediate modulus ranges from 1:0.4 to 1:0.85, and a ratio of the initial modulus to the final modulus ranges from 1:4 to 1:9.

2. The hybrid cord of claim 1, wherein the stress-strain curve of the hybrid cord includes first and second modulus transition points, the first transition point is present within a strain range from 0.003 to 0.025, and the second transition point is present within a strain range from 0.03 to 0.065.

3. The hybrid cord of claim 1, wherein the hybrid cord includes a low-modulus fiber ply composed of aliphatic polyamide fiber, and at least one high-modulus fiber ply composed of one selected from the group consisting of aramid yarn, polyketone and wholly aromatic polyester, and combined with and twisted together with the low-modulus fiber ply.

4. The hybrid cord of claim 3, wherein the hybrid cord includes 20-80% of 500-1600 denier aramid yarn and 80-20% of 400-1300 denier polyamide 66 yarn.

5. The hybrid cord of claim 3, wherein the aramid yarn is high-strength aramid yarn whose tensile strength is equal to or higher than 16 g/D and whose Young's modulus ranges from 200 g/d to 1200 g/d.

6. The hybrid cord of claim 5, wherein the hybrid cord has a twist factor $\alpha_d$ ranging from 100 to 250, and the twist factor $\alpha_d$ is expressed by the following Equation:

$$\alpha_d = \frac{T}{100}\sqrt{\rho_d}$$

where $\alpha_d$ is a denier-based twist factor, T is twists per meter (TPM), and $\rho_d$ is a fineness based on corrected weight of the hybrid cord on a denier basis.

7. A high-performance radial tire, wherein the hybrid cords set forth in claim 1 is used.

8. The high-performance radial tire of claim 7, wherein the hybrid cord is used in a cap ply.

* * * * *